Nov. 9, 1965  S. A. COLORATO  3,217,093
BROKEN CONDUIT PIPE COUPLING
Filed Sept. 6, 1962
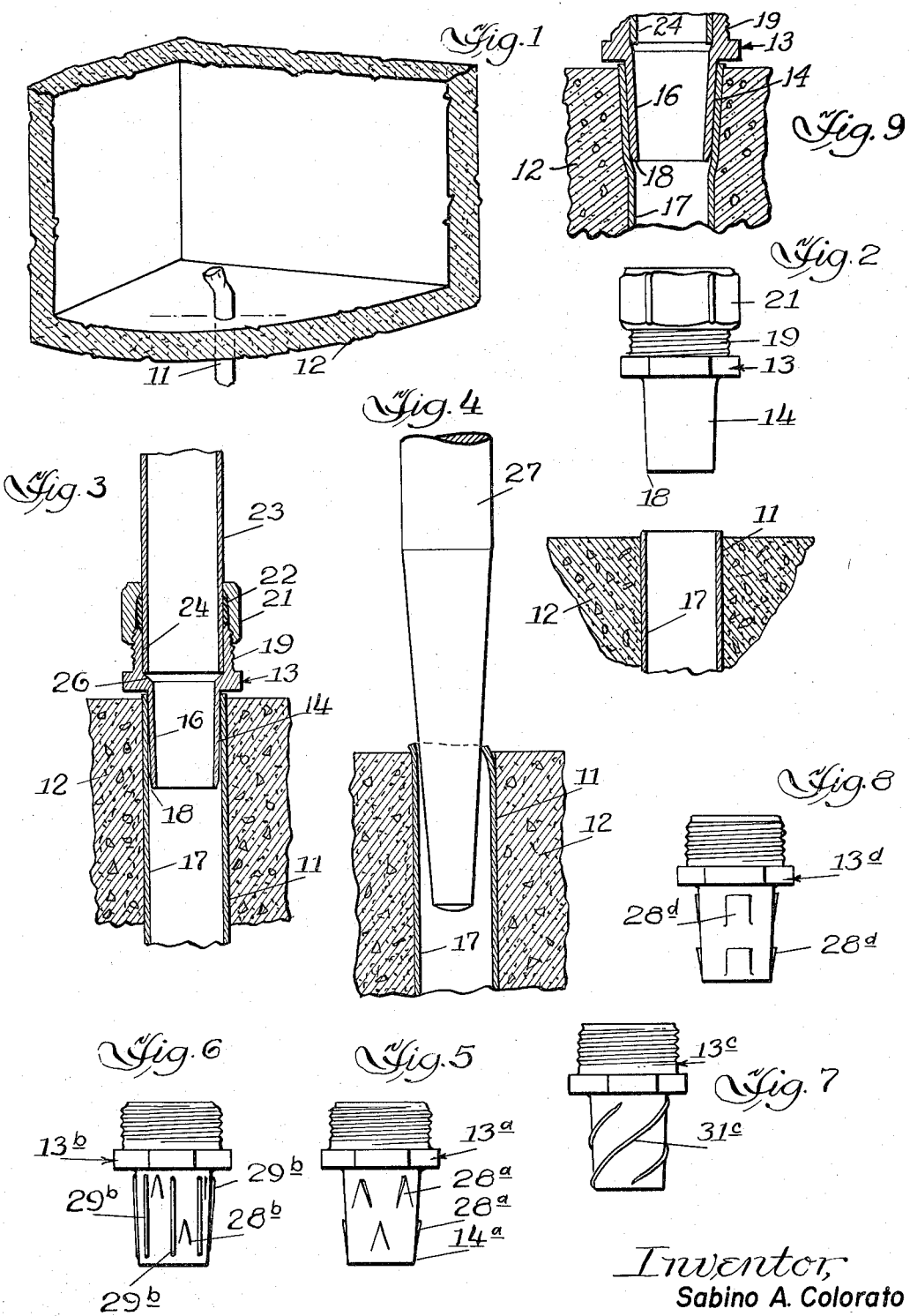
Inventor,
Sabino A. Colorato
By: Schneider, Dressler, Goldsmith & Clement, Attys.

United States Patent Office
3,217,093
Patented Nov. 9, 1965

1

3,217,093
BROKEN CONDUIT PIPE COUPLING
Sabino A. Colorato, 540 Andy Drive, Melrose Park, Ill.
Filed Sept. 6, 1962, Ser. No. 221,781
5 Claims. (Cl. 174—84)

This invention relates to a coupling for electrical conduits and particularly to a coupling adapted to connect a broken section of electrical conduit to a new section thereof.

Thin-walled metallic electrical conduits are used to protect electrical wiring in many installations. In some cases a portion of the conduit is solidly embedded in a rigid material, such as concrete, as for example, in passing through a concrete floor or wall.

When a conduit partially encased in concrete is accidentally broken off near the surface of the concrete, it is difficult to couple a fresh length of conduit to the broken end. The broken end usually has a jagged edge, with burrs of irregular dimensions. The broken end is usually non-circular in cross section and sometimes quite flattened out.

In order to attach a length of conduit to a broken end of this type, compression ring couplings are commonly used. Internally threaded screw type coupling or crimp bound couplings have also been used. All of these couplings are attached to the outside of the broken conduit. Outside attachment requires that a broken end of the coupling be reshaped to its original circular cross section by the hammering of a tapered drift pin into the conduit. It also requires the chopping away of concrete when the break is flush with the surface of the concrete to permit the external coupling to grip the outer surface of the conduit. The vast majority of breaks in partially embedded conduits occur at places which are flush or almost flush with the surface of the embedding material.

Outside attachment of the coupling also requires evening up and smoothing off of the tips of the broken end. All of the above operations are time consuming and add considerably to the cost of an installation. In addition, the couplings themselves are complex and expensive.

It is an object of this invention to provide a coupling for electrical conduits which is simple in construction and easy to attach to a broken conduit embedded in a rigid material. Other objects of the invention will appear hereinafter.

The objects of this invention are achieved by a coupling for attachment to an electrical conduit, said conduit having an inside diameter that is substantially uniform throughout its length, which comprises: (1) a tapered friction pipe having an inside diameter substantially equal to the inside diameter of the electrical conduit to which it is to be frictionally attached and having a tapered outer wall, said outer wall having an outside diameter that increases from a dimension about equal to said inside diameter at one open end of said fraction pipe to a larger dimension along the shank of the pipe, to produce a frictional engagement between said outer wall and the inner wall of said conduit when the tapered friction pipe is inserted in the conduit; and (2) securing means for attaching the other end of said tapered friction pipe to a second electrical conduit that is to be joined to said first mentioned conduit.

The invention may be more readily understood by reference to the drawing, of which:

FIGURE 1 is a perspective view (partially in section) of a thin walled pipe embedded in a rigid material and broken off near the surface of the rigid material;

FIGURE 2 is a side elevation (partially in section) showing in exploded position, a coupling of this invention and an embedded conduit end into which the coupling may be driven;

FIGURE 3 is a section showing a coupling driven into position into the broken end of the lower conduit and attached to the new conduit;

FIGURE 4 is an elevation (partially in section) showing a drift pin in position to reshape the opening at the broken end of the conduit;

FIGURES 5, 6, 7 and 8 are elevations showing other embodiments of the coupling of this invention; and FIGURE 9 is a section comparable to FIGURE 3, but showing a coupling wherein the inside diameter of the friction pipe is equal to the inside diameter of the electrical conduit and the conduit has been partially opened at its end by a drift pin to permit it to receive the friction pipe.

Referring to FIGURES 1 to 3, conduit 11 passes through concrete floor 12 and is rigidly embedded therein. Coupling 13, having at one end thereof a friction pipe having a tapered outer wall 14, is adapted to be driven into the open end of the broken conduit. The inner surface 16 of the friction pipe is substantially identical in diameter to the inner surface 17 of the conduit, but preferably slightly smaller as shown in FIGURE 3. The outer tapered surface of the friction pipe tapers down at its tip 18 to a diameter also about equal to the inside diameter of the conduit and also preferably slightly smaller.

The upper end of the coupling in this embodiment has an externally threaded portion 19 adapted to thread into internally threaded nut 21, which latter performs a locking function as will be described. The inner surface of nut 21 tapers to a smaller diameter at its upper end. Locking compression ring 22 is seated within nut 21 and above the threaded portion thereof. The compression ring is made of spring steel and normally comprises a slightly opened circle, with a gap between the ends of the ring which abut upon the opening. When nut 21 is tightened onto threaded portion 19, the compression ring is forced into the upper portion of the nut where the inner surface tapers to the above mentioned smaller diameter. The compression ring itself thus assumes a smaller diameter as it is forced into the space with a smaller diameter, and as a result its opening closes.

The upper end 24 of the inner surface of the coupling is of enlarged diameter adapted to receive the outer diameter of a fresh length of conduit 23. Conduit 23 may be inserted as far as shoulder 26 in the inner surface of the coupling. When conduit 23 is inserted into the coupling and nut 21 is tightened, compression ring 22 reduces in diameter to grip the fresh length of conduit tightly.

In many cases, when the outer diameter of the tip of the tapered end of the coupling is slightly smaller than the inside diameter of the conduit and the conduit has not distorted too badly at its break, it is possible to insert the coupling directly into the broken end and dispense entirely with the use of a drift pin. In other cases, as shown in FIGURES 4 and 9, the use of a drift pin 27 to reshape and enlarge the opening at the broken end is necessary. In FIGURE 9 the elements are similar to those of FIGURE 3, except for the relative sizes of the conduit and the coupling and are designated by numerals identical to those of FIGURE 3.

However, even when a drift pin must be used, it need not reshape the opening at the broken end to the same degree of circularity as must be attained for couplings which engage the outer surface of the broken conduit. Since the coupling is made of hard but tough material, such as case hardened steel, the tapered end of the coupling acts as its own drift pin in reshaping the soft thin walled conduit.

When inserted in the end of the broken conduit, the coupling made of hard, strong material, will cause the soft, thin walled conduit to expand. For this reason, the internal diameter 16 of the coupling can usually be substantially the same as internal diameter 17 of the soft conduit 11. With some types of brittle concrete, when the outer diameter of the coupling is larger than the inner diameter of the soft, thin walled conduit, the expansion of the conduit may cause slight concrete breakage; but with other types of concrete, no breakage will result. With brittle concrete, it is preferable to use a coupling having a slightly smaller outside diameter at the tip than the inner diameter of the conduit, such as shown in FIGURE 3.

The degree of taper at the tapered end of the coupling is relatively slight, preferably of the order of about 0.010" to about 0.030" of diameter increase per linear inch of tapered surface. A slight degree of taper provides a relatively large engaging area where the outer surface of the tapered end of the coupling is in direct contact with the inner surface of the conduit. A large area of engagement provides firm attachment.

If even more secure attachment is desired, an embodiment providing locking protuberances on the tapered outer surface of the coupling may be preferred. Such embodiments are illustrated in FIGURES 5, 6, 7 and 8. In FIGURE 5, coupling 13a is generally similar to coupling 13 of FIGURES 2 and 3, except that locking protuberances 28a having sharp apexes protrude from the tapered surface 14a and taper from the vertical at a greater angle than the tapered surface, itself. When the coupling of FIGURE 5 is driven into a conduit end, the locking protuberances 28a engage the inner surface of the conduit tightly to provide secure attachment. The coupling of FIGURE 5 resists being pulled out of the conduit since sharp apexes of the locking protuberances engage the relatively soft inner surfaces of the conduit and tend to embed themselves as force is applied to withdraw the coupling.

In FIGURE 6, coupling 13b has locking sharp apexed protuberances 28b similar to the protuberances 28a of FIGURE 5. In addition, there are a series of vertical ridges 29b which protrude from the outer tapered surface to provide tight engagement (primarily for the purpose of assuring a good electrical contact between the coupling and the pipe to which it is attached) with the inner surface of the conduit.

In FIGURE 7, the spiral ridge 31c having a sharp apex serves as a locking thread on coupling 13c, and at the same time provides a reliable electrical contact between the conduit and coupling.

In FIGURE 8, coupling 13d is generally similar to the coupling of FIGURE 5 except that rectangular wedge shaped protuberances 28d are provided, instead of the angular protuberances of FIGURE 5.

In a typical telephone installation a conduit having an inside diameter of about 0.560" (about 9/16") and a wall thickness of about 0.020" is broken off at a point close to the surface of a concrete floor in which it is partially embedded. The broken end of the pipe is reshaped sufficiently to permit the insertion of a coupling similar to that of FIGURE 5. The reshaping is accomplished by driving a drift pin into the broken end of the conduit.

The coupling is made of case hardened steel and has an inside diameter at its tapered portion of about 0.540" and outside diameter at the tip of its tapered portion of about 0.550". The length of the tapered portion is about ¾" and the outside diameter at the upper end of the tapered portion is about 0.580". The outer surface of the tapered portion has about eight sharp apexed protuberances to serve as locking protuberances, and to provide firm engagement between the tapered surface of the coupling and the inner surface of the conduit.

The upper end of the coupling is externally threaded for engagement with the nut and for compression of the compression ring as is well known in the art.

The above detailed description of this invention has been given for clearness of understanding only. No unnecessary limitations should be understood therefrom, as modifications will be obvious to those skilled in the art.

I claim:
1. In combination, a metallic electrical conduit and a metallic coupling attached to said conduit, said conduit having an inside diameter that is substantially uniform throughout its length, which coupling comprises: (1) a tapered friction pipe having an inside diameter substantially equal to the inside diameter of the electrical conduit to which it is frictionally attached and having a tapered outer wall, said outer wall having an outside diameter that increases from a dimension about equal to said inside diameter at one open end of said friction pipe to a larger dimension along the shank of the pipe, to produce a frictional engagement between said outer wall and the inner wall of said conduit upon insertion of the tapered friction pipe into the conduit; (2) widened means about said friction pipe at the larger end thereof to prevent insertion of said friction pipe into said conduit beyond said widened means; and (3) securing means for attaching the other end of said tapered friction pipe to a second electrical conduit that is to be joined to said first mentioned conduit.

2. In combination, a metallic electrical conduit and a metallic coupling attached to said conduit, said conduit having an inside diameter that is substantially uniform throughout its length, which coupling comprises: (1) a tapered friction pipe having an inside diameter substantially equal to the inside diameter of the electrical conduit to which it is frictionally attached and having a tapered outer wall, said outer wall having an outside diameter that increases from a dimension about equal to said inside diameter at one open end of said friction pipe to a larger dimension along the shank of the pipe, to produce a frictional engagement between said outer wall and the inner wall of said conduit upon insertion of the tapered friction pipe into the conduit, said outer wall carrying at least one locking protuberance, said protuberance having a sharp apex at its end away from said above mentioned open end of the tapered friction pipe; (2) widened means about said friction pipe at the larger end thereof to prevent insertion of said friction pipe into said conduit beyond said widened means; and (3) securing means for attaching the other end of said tapered friction pipe to a second electrical conduit that is to be joined to said first mentioned conduit.

3. In combination, a metallic electrical conduit and a metallic coupling attached to said conduit, said conduit having an inside diameter that is substantially uniform throughout its length, which coupling comprises: (1) a tapered friction pipe having an inside diameter substantially equal to the inside diameter of the electrical conduit to which it is frictionally attached and having a tapered outer wall, said outer wall having an outside diameter that increases from a dimension about equal to said inside diameter at one open end of said friction pipe to a larger dimension along the shank of the pipe, to produce a frictional engagement between said outer wall and the inner wall of said conduit upon insertion of the tapered friction pipe into the conduits, said outer wall carrying at least one wedge shaped locking protuberance, said wedge shaped protuberance having its thin end toward said above mentioned open end of the tapered friction pipe and a sharp apex at the other end of the protuberance; (2) widened means about said friction pipe at the larger end thereof to prevent insertion of said friction pipe into said conduit beyond said widened means; and (3) securing means for attaching the other end of said tapered friction pipe to a second electrical conduit that is to be joined to said first mentioned conduit.

4. In combination, a metallic electrical conduit and a metallic coupling attached to said conduit, said conduit having an inside diameter that is substantially uniform throughout its length, which coupling comprises: (1) a tapered friction pipe having an inside diameter substantially equal to the inside diameter of the electrical conduit to which it is frictionally attached and having a tapered outer wall, said outer wall having an outside diameter that increases from a dimension about equal to said inside diameter at one open end of said friction pipe to a larger dimension along the shank of the pipe, to produce a frictional engagement between said outer wall and the inner wall of said conduit upon insertion of the tapered friction pipe into the conduit, said tapered friction pipe carrying locking threads upon its outer wall, said threads having sharp apexes; (2) widened means about said friction pipe at the larger end thereof to prevent insertion of said friction pipe into said conduit beyond said widened means; and (3) securing means for attaching the other end of said tapered friction pipe to a second electrical conduit that is to be joined to said first mentioned conduit.

5. In combination, a metallic electrical conduit and a metallic coupling attached to said conduit, said conduit having an inside diameter that is substantially uniform throughout its length, which coupling comprises: (1) a tapered friction pipe having an inside diameter substantially equal to but slightly smaller than the inside diameter of the electrical conduit to which it is frictionally attached and having a tapered outer wall, said outer wall having an outside diameter that increases from a dimension about equal to said inside diameter of said friction pipe at one open end thereof to produce a frictional engagement between said outer wall and the inner wall of said conduit upon insertion of the tapered friction pipe into the conduit; (2) widened means about said friction pipe at the larger end thereof to prevent insertion of said friction pipe into said conduit beyond said widened means; and (3) securing means for attaching the other end of said tapered friction pipe to a second electrical conduit that is to be joined to said first mentioned conduit.

References Cited by the Examiner
UNITED STATES PATENTS

| | | | |
|---|---|---|---|
| 567,962 | 9/96 | Cooper | 138—97 |
| 1,750,790 | 3/30 | Bessonett | 285—382.2 |
| 2,328,469 | 8/43 | Laffey. | |
| 2,624,598 | 1/53 | Quinlan | 285—177 X |
| 2,990,533 | 6/61 | Hughes et al. | 339—95 X |

FOREIGN PATENTS

| | | |
|---|---|---|
| 696,229 | 12/30 | France. |
| 3,299 | 3/85 | Great Britain. |
| 581,182 | 3/44 | Great Britain. |

JOHN F. BURNS, *Primary Examiner.*

JOHN P. WILDMAN, E. JAMES SAX, DARRELL L. CLAY, *Examiners.*